United States Patent
Mohamadi

(10) Patent No.: US 9,459,345 B2
(45) Date of Patent: Oct. 4, 2016

(54) PASSIVE DETECTION OF UNAUTHORIZED ELECTRONIC DEVICES USING WAFER SCALE BEAM FORMING

(71) Applicant: Farrokh Mohamadi, Irvine, CA (US)

(72) Inventor: Farrokh Mohamadi, Irvine, CA (US)

( * ) Notice: Subject to any disclaimer, the term of this patent is extended or adjusted under 35 U.S.C. 154(b) by 231 days.

(21) Appl. No.: 14/276,987

(22) Filed: May 13, 2014

(65) Prior Publication Data

US 2014/0333466 A1    Nov. 13, 2014

Related U.S. Application Data

(60) Provisional application No. 61/822,770, filed on May 13, 2013.

(51) Int. Cl.
*G01S 13/88*    (2006.01)

(52) U.S. Cl.
CPC .................... *G01S 13/887* (2013.01)

(58) Field of Classification Search
CPC ..................................... G01S 13/887
USPC .......................................... 342/27
See application file for complete search history.

(56) References Cited

U.S. PATENT DOCUMENTS

| | | | |
|---|---|---|---|
| 2010/0173586 A1* | 7/2010 | McHenry | H04L 27/0006 455/62 |
| 2011/0093427 A1* | 4/2011 | Waite | G06N 99/005 706/52 |

* cited by examiner

*Primary Examiner* — Timothy A Brainard

(74) *Attorney, Agent, or Firm* — Haynes and Boone, LLP

(57) ABSTRACT

Systems and methods for screening, where a subject walks through or in front of a passive detector (or scanning unit) to be screened for possession of unauthorized electronics devices, provide for detecting and monitoring electronics systems not authorized to be used in secure areas. By focusing a very narrow beam width antenna array, individuals can be screened who may have concealed electronics devices that can pose danger to the surroundings. There is no need for removing clothing or accessories such as a jacket or backpack, for example. The detection system may include a frequency scanned passive receiver that captures a signal from a detected electronics device, measures its strength, and identifies the device or classifies it according to a pre-determined set of categories (e.g., cellular phone, camera, or global positioning system (GPS)).

7 Claims, 10 Drawing Sheets

|  | A | B | C |
|---|---|---|---|
| Antenna Dipoles | 30 | 8 | 21 |
| Beam Width Azimuth (Degree) | 120 | 92 | 116 |
| Beam Width Latitude (Degree) | 36 | 42 | 34 |
| Bandwidth (MHz) | 2250 | 900 | 800 |
| 1st 10 dB (MHz) | 250 | 1600 | 400 |
| 2nd 10 dB (MHz) | 2500 | 2500 | 1200 |
| Average S11 (dB) | -30 | -25 | -25 |
| Antenna Gain (dBi) | 7.85 | 7.85 | 8.45 |
| F/B Gain (dB) | 26.35 | 29.25 | 26.65 |
| Back Side Attenuation (dB) | -18.5 | -21.4 | -18.2 |

FIG. 8

| Band | Uplink (MHz) | Downlink (MHz) | Carrier Bandwidth (MHz) | Comments |
|---|---|---|---|---|
| 700 MHz | 746-763 | 776-793 | 1.25 5 10 15 20 | Digital Dividend. U.S. commercial spectrum auctioned Q108. "D" block to be re-auctioned. Potential future alignment with Europe |
| AWS | 1710-1755 | 2110-2155 | 1.25 5 10 15 20 | U.S. Auctions completed September 2006 |
| IMT Extension (Paired) | 2500-2570 | 2620-2690 | 1.25 5 10 15 20 | Initially Western Europe. Offers a unique opportunity for the deployment of LTE in channels of up to 20 MHz. |
| IMT Extension (Unpaired) | 2570-2620 | | 1.25 5 10 15 20 | Potential for LTE-TDD in Europe and Asia Pac. |
| GSM 900 | 880-915 | 925-960 | 1.25 5 10 15 20 | Reallocate this spectrum to advanced networks, such as LTE, from 2009 onwards |
| UMTS Core | 1920-1980 | 2110-2170 | 1.25 5 10 15 20 | Europe and Asia Pac. Potential for unused WCDMA carriers |
| GSM 1800 | 1710-1785 | 1805-1880 | 1.25 5 10 15 20 | Europe and Asia Pac. Refarm underutilized band along with GSM 900 |
| PCS 1900 | 1850-1910 | 1930-1990 | 1.25 5 10 15 20 | U.S. Refarm after new 700 MHz and AWS spectrum is consumed. |
| Cellular 850 | 824-849 | 869-894 | 1.25 5 10 15 20 | U.S. Refarm after new 700 MHz and AWS spectrum is consumed. |
| Digital Dividend | 470-854 | | 1.25 5 10 15 20 | Identified at WRC-07 |

FIG. 9

PASSIVE DETECTION OF UNAUTHORIZED ELECTRONIC DEVICES USING WAFER SCALE BEAM FORMING

CROSS REFERENCE TO RELATED APPLICATIONS

This application claims the benefit of priority from U.S. Provisional Patent Application No. 61/822,770, filed May 13, 2013, which is incorporated by reference.

BACKGROUND

1. Field of the Invention

The present invention relates generally to radar imaging systems and, more particularly, to security screening of individuals, using ultra wideband passive receiver systems integrated with wafer scale, narrow beam width antenna arrays, to detect concealed electronic devices.

2. Related Art

An important security issue that arises for secure areas in public places—such as public gatherings, voting lines, entrances of stadiums, government agency offices, religious gathering places, banks, markets, airports, schools, and government facilities, for example—is detection of unauthorized electronic devices which often may be concealed, e.g., cell phones or smart phones, personal computers, pads or tablets that may be carried by a person and concealed, for example, underneath or within clothing or in luggage or other hand-carried items. Many of the entities responsible for public safety in such places, such as government agencies, may find an advanced portable imaging technology with automated threat recognition for screening individuals to be highly desirable—for example, an easy-to-set-up apparatus requiring less than 30 minutes installation time to be ready to be used anywhere for detecting unauthorized electronic devices on a person.

BRIEF DESCRIPTION OF THE DRAWINGS

FIG. 8 is a table showing comparison of various attributes for different implementations of an electronic device detector in accordance with one or more embodiments.

FIG. 9 is a table showing various frequency bands and some of their attributes of interest for applications of an electronic device detector in accordance with one or more embodiments.

Figure 1A:
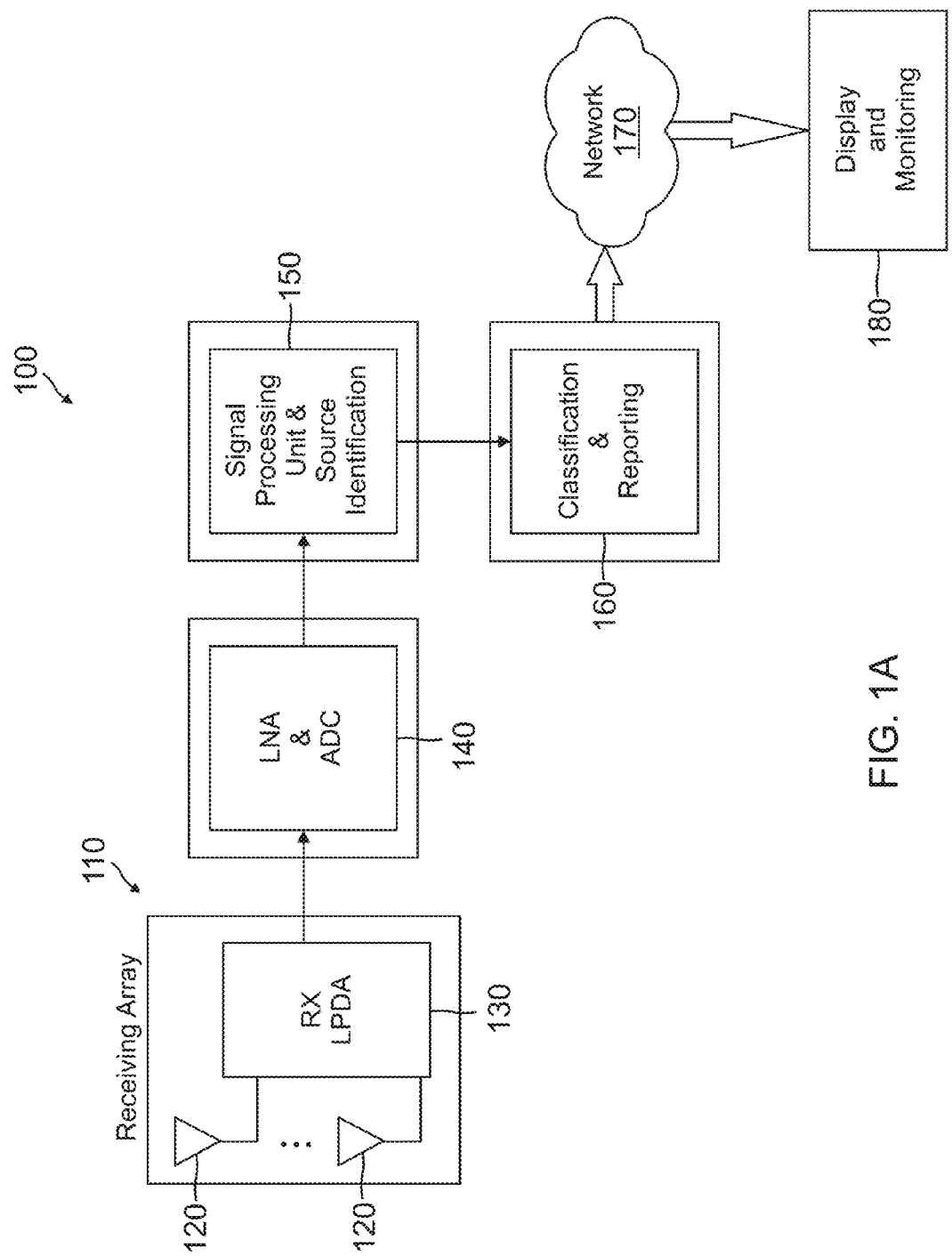
FIG. 1A is a system block diagram illustrating an electronic device detector in accordance with an embodiment of the present invention.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Methods and systems are disclosed that address the need for detecting and monitoring electronics systems not authorized to be used in secure areas. In one or more embodiments, by focusing a very narrow beam width antenna array, individuals can be screened who may have concealed electronics devices that can pose danger to the surroundings. One or more embodiments may implement a system for screening, where the subject walks through or in front of a passive detector (or scanning unit) to be screened for possession of unauthorized electronics devices. There is no need for removing clothing or accessories such as a jacket or backpack, for example.

In one embodiment, passive array electronic device sensors can be placed as a chain of sensors embedded inside construction of a building, or otherwise covertly placed, encompassing sensitive areas in such a way that tracking a person with an unauthorized electronic device may be enabled. A screening system according to one or more embodiments may be used to manage inventory of a crowded venue with multiple active devices—such as museums, legal offices, and security offices—where, for example, after regular hours no one should be on the premises. Similarly, screening systems according to one or more embodiments may be used to detect certain caller IDs or active RFID devices as being authorized personnel and allow access to the premises.

The detection system may include a frequency scanned passive receiver that captures a signal from a detected electronics device, measures its strength, and identifies the device or classifies it according to a pre-determined set of categories (e.g., cellular phone, camera, or global positioning system (GPS)). Results may be displayed for monitoring at a remote location or in the vicinity of the scanning area. The scanning unit may communicate with a remote command and monitoring station through a secure network.

One or more embodiments may include implementation of a fully integrated FCC compliant screener using miniaturized wafer scale antenna arrays to form spatial power combining and narrow beam forming. One or more embodiments may include implementation of a receiver array to sweep the received frequencies and identify sources of radio frequency (RF) radiation by type such as cellular phone, camera, or GPS, for example, for detected source classification. One or more embodiments may include stick diagram presentation (addressing privacy concerns and issues) of visual screen and audio alarms from scanned data, where stick diagram presentation is intended to mean a sufficient suppression of graphic imaging detail to preserve privacy yet enable location on the person of the contraband object. Such presentation may range, for example, from presenting a more or less accurate outline of body parts to presenting only the most abstract "stick figure" representation of body parts. One or more embodiments may include mounting of a receiver array detector device on a robot or vehicle to seek the source of RF radiation in protected areas. One or more embodiments may include capability to identify remotely based explosive triggering devices. One or more embodiments may include extended range application using active array antenna. One or more embodiments may include a substantially flat and small form factor multi band-pass receiver over a 10 MHz to 100 GHz frequency range using a high absorption, ultra sensitive receiver.

Various embodiments may incorporate teachings from U.S. Patent Publication No. 2012/0001674 published Jan. 5, 2012, entitled "Wafer Scale Spatial Power Combiner"; U.S. Patent Publication No. 2013/0248656 published Sep. 26, 2013, entitled "Integrated Wafer Scale, High Data Rate, Wireless Repeater Placed On Fixed Or Mobile Elevated Platforms"; U.S. Patent Publication No, 2013/0307716 published Nov. 21, 2013, entitled "Integrated Ultra Wideband, Wafer Scale, RHCP-LHCP Arrays"; U.S. Pat. No. 7,610, 064, issued Oct. 27, 2009, entitled "Direct Downlink RF Module"; U.S. Pat. No. 7,750,860, issued Jul. 6, 2010, entitled "Helmet Antenna Array System"; U.S. Pat. No. 7,884,776, issued Feb. 8, 2012, entitled "High Power Integrated Circuit Beamforming Array"; U.S. Pat. No, 8,154, 339, issued Apr. 10, 2012, entitled "V-Band High-Power Transmitter with Integrated Power Combiner"; and U.S. Pat. No. 8,237,604, issued Aug. 7, 2012, entitled "Virtual Beamforming in Ultra Wideband Systems", all of which are incorporated by reference.

FIG. 1A is a system block diagram illustrating an electronic device detection system 100 in accordance with an embodiment of the present invention. System 100 may embody the integration of multiple arrays 120 of each sensor (typically 4×4 and 8×8 arrays) into a receiver array 110 to operate at the 0.1-10 GHz bands or, alternatively, may embody a log-periodic array 120 to detect sources of many different transmitters such as cellular phones which may be classified into categories as shown in FIG. 9. In one embodiment, multiple arrays can be independently spatially separated for monitoring or detecting on different frequency bands.

The receiver 130 shown in FIG. 1A may take advantage of the beam forming by receiver array 110—for example, by manipulating phase response of antenna arrays 120—to focus on a desired area, e.g., the location of a subject being scanned. A narrow beam also can be formed by use of a lens to cover a window of approximately 0.7 meters (m) at 3 m away. A concealed electronic device can thereby be detected at a frequency band of interest to classify the source of RF radiation, e.g., an electronics device such as a cellular phone, camera, GPS unit, recording device, or other category of electronic device.

System 100 may include low noise amplifiers (LNA) and analog to digital converter (ADC) 140 in communication with receiver 130 for initial processing of RF signals from receiver 130. System 100 may include a signal processing unit 150 in communication with receiver 130 through LNA and ADC 140. Signal processing unit 150 may include digital signal processing (DSP), for example, for identifying the RF signal (e.g., identifying the source or the type of source for the RF signal) from receiver 130, System 100 may include a classification and reporting unit 160 configured to categorize the identified RE signal and report a result according to a set of pre-determined categories. Classification and reporting unit 160 may communicate with a local (in vicinity of receiver array 110) or remote command and monitoring station 180 through a secure network 170.

Figure 1C:
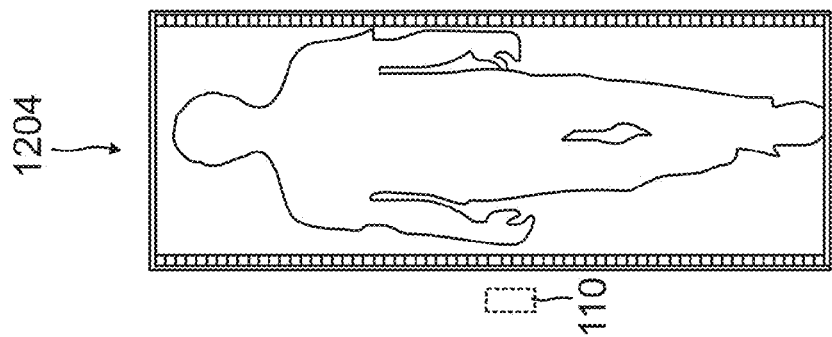
FIG. 1C is a physical illustration of a deployment of a wafer scale electronic device detector system, in accordance with one or more embodiments.
Figure 1B:
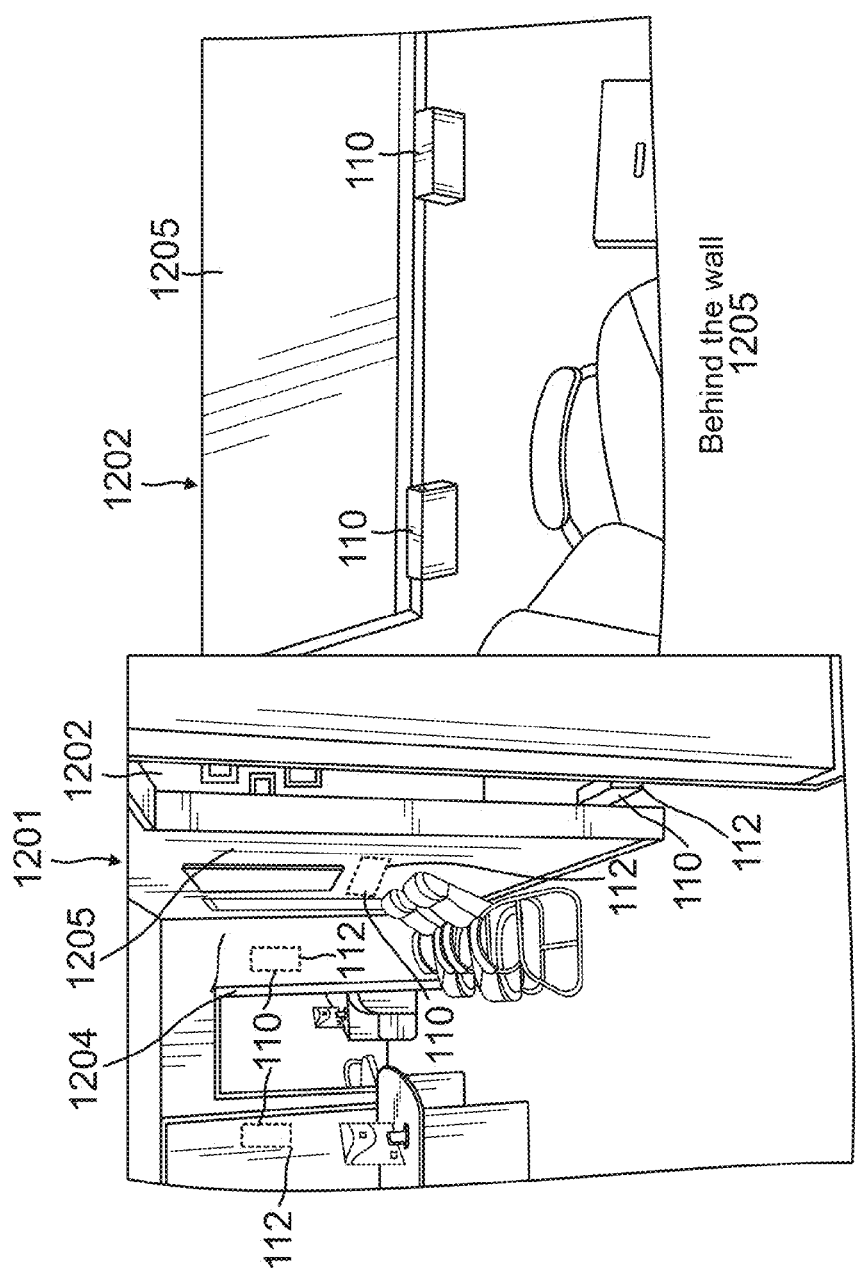
FIG. 1B is a perspective diagram illustrating an example of a physical installation of electronic device detector units for surveillance in an interior of a building, in accordance with an embodiment.

FIG. 1B is a perspective diagram illustrating an example of a physical installation of electronic device detector system 100 for surveillance in an office or other setting in accordance with an embodiment. As seen in FIG. 1B, electronic device detection system 100 may be used for surveillance of interior building space 1201 from office space 1202 with placement of receiver arrays 110 behind wall 1205, hidden from space 1201. Also as shown in FIGS. 1B and 1C, because of the compact nature of a fully integrated, solid state screening system 100, and additionally due to the nature of the antenna design of antenna array 120 being very flat, the receiver array 110 can be placed inside door frames of hall way entrances covertly. This will impede tampering with the device's detector. For example, the installation (e.g., of a receiver array 110) can be unobtrusive as seen in FIG. 1B and can even be placed covertly, such as inside an office's dry wall (e.g., near a door frame 1204) as shown in FIG. 1C.

A plurality of passive array electronic device sensors 110 can be placed as a chain 112 of sensors embedded inside construction of a building (e.g., in interior building space 1201), or otherwise covertly placed, to encompass sensitive areas in such a way that tracking a person with an unauthorized electronic device may be enabled. For example, a monitoring station 180 in communication via a network 170 with the chain 112 of electronic device detector units (each of which may include, for example, a receiver array 110, LNA and ADC 140, signal processing unit 150, and classification and reporting unit 160) may be configured to track a detected electronic device using a known location for each of the electronic device detector units of the chain 112.

A screening system (e.g., classification and reporting unit 160) may be used to manage inventory of a crowded venue in which multiple active devices may be in use—such as in museums, legal offices, and security offices—where, for example, after regular hours no one should be on the premises. Similarly, screening systems according to one or more embodiments may be used to detect certain caller IDs or active RFID devices as being authorized personnel and allow access to the premises.

For monitoring of system 100, command and monitoring station 180 may be located in space 1202 or anywhere that is within range of wireless communication network 170 connectivity. Thus, flexibility of operation is provided, for example, for covert surveillance and monitoring of space 1201. The same flexibility for monitoring locations may be useful for other applications of electronic device detector system 100, such as for the examples provided above. For example, system 100 can be installed inside or outside a building or used as a portable interrogator in a military setting, for example, in a search and track mission to detect and track individuals and electronic devices hidden behind walls. System 100 can also be augmented with complementary sensors (not shown)—such as infrared (IR) or video cameras—for thermal and visual inspection.

Figure 2:
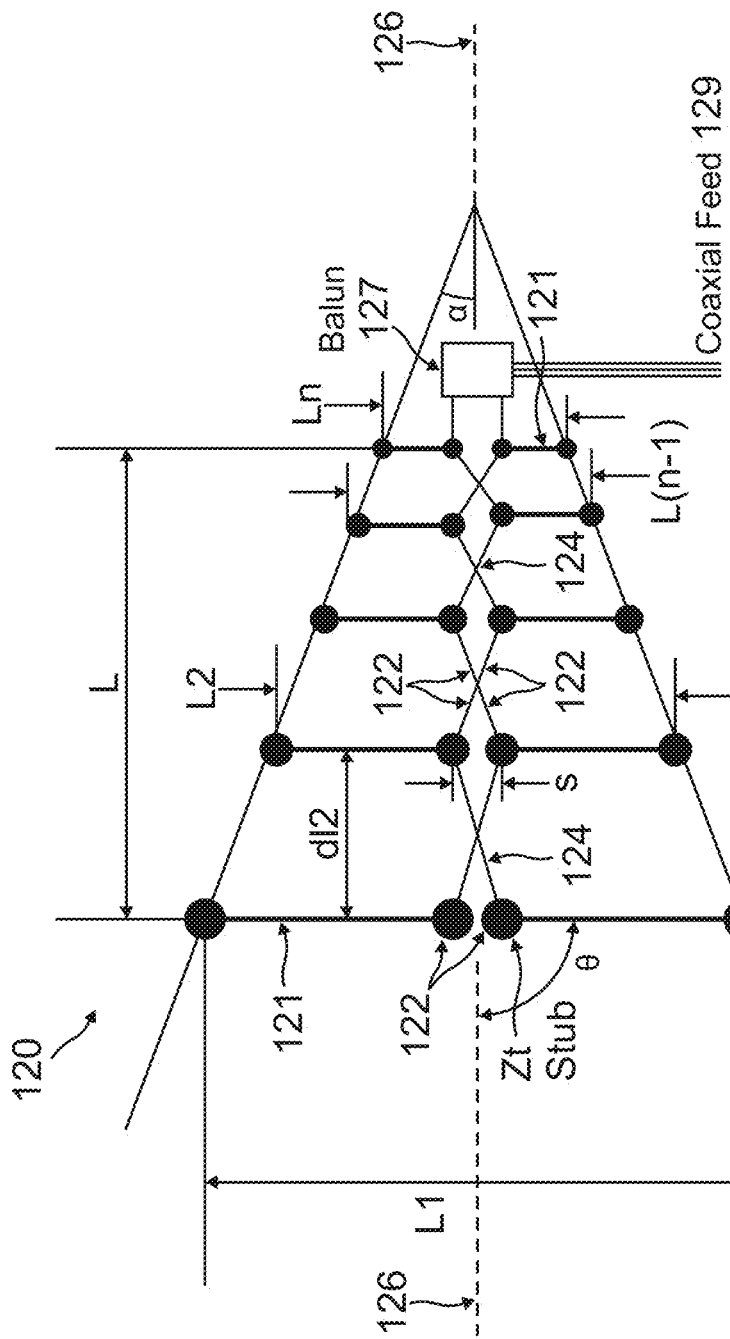
FIG. 2 is a schematic diagram illustrating design parameters for a log periodic dipole antenna array for the detector of FIG. 1, in accordance with one or more embodiments.

FIG. 2 is a schematic diagram illustrating design parameters for a log periodic dipole antenna array for the detector of FIG. 1, in accordance with one or more embodiments.

In general, a log-periodic dipole array (LPDA)—such as LPDA 120 shown in FIG. 2—consists of a system of driven elements 121, but not all elements in the system are active on a single frequency of operation. Depending upon its design parameters (e.g., L, Ln, dl2, α, s, Zt) the LPDA can be operated over a range of frequencies having a ratio of 2:1 or higher, and over this range its electrical characteristics—e.g., gain, feed-point impedance, front-to-back ratio (F/B)—can remain more or less constant. The same is not true, in general, of a multi-element directive array antenna, for either the gain factor or the front-to-back ratio, or both, deteriorate rapidly as the frequency of operation departs from the design frequency of the array. Because the multi-element directive array antenna designs are based upon resonant elements, off-resonance operation introduces reactance that causes the voltage standing wave ratio (VSWR) in the feeder system to increase.

As may be seen in FIG. 2, the log-periodic dipole array 120 may consist of several dipole elements 121, which may be of different lengths and may have different relative spacing from each other. A distributive type of feeder system 124 may be used to accumulate signals received by each individual element 121. The element lengths (e.g., L1 ... Ln) and relative spacing (e.g., dl2), beginning from the receiver point for the array, may be seen to increase smoothly (e.g., by a constant ratio) in size, being greater for each element than for the previous element in the array. It is this feature upon which the design of the LPDA is based, and which permits changes in frequency to be made without greatly affecting the electrical operation. With changes in operating frequency, there can be a smooth transition along the array of the elements that comprise the active region.

A robust LPDA design may be achieved for any frequency band. For example, a wafer scale LPDA can be realized to meet the sensor's (e.g., electronic device detection system 100) requirements at nominal cost, with high forward gain, good front-to-back ratio, low VSWR, and a boom length equivalent to a full sized thirty-element LPDA to cover 200 MHz to 2500 MHz frequency bands. The LPDA can exhibit a relatively low SWR (usually not greater than 2 to 1) over a wide band of frequencies. A well-designed LPDA can yield a 1.3:1 SWR over a 1.8:1 frequency range with a typical directivity of 9.5 dB. Assuming no resistive losses in the antenna system, 9.5 dB directivity equates to 9.5 dB gain over an isotropic radiator, or approximately 7.4 dB gain over a half-wave dipole.

As shown in FIG. 2, LPDA 120 may include feeder system 124 for feeding RF signals between antenna elements 121 and balun 127 and coaxial feed 129 to receiver 130. Signal feed system 124 may include switching elements 122 for switching selected antenna elements 121 in and out of the array 120 so that various subsets of the plurality of antenna elements 121 may be selected to be operational with receiver 130. In other words, active portions of LPDA 120 may be selected using switches 122. Array 120 may have a symmetrical axis 126 and each element 121 may have a tilt θ to axis 126. The tilt θ shown in FIG. 2 is that of a conventional LPDA, e.g., 90°, but a tilt other than 90° may be employed, as shown, for example, in FIGS. 3 and 5.

Figure 3:
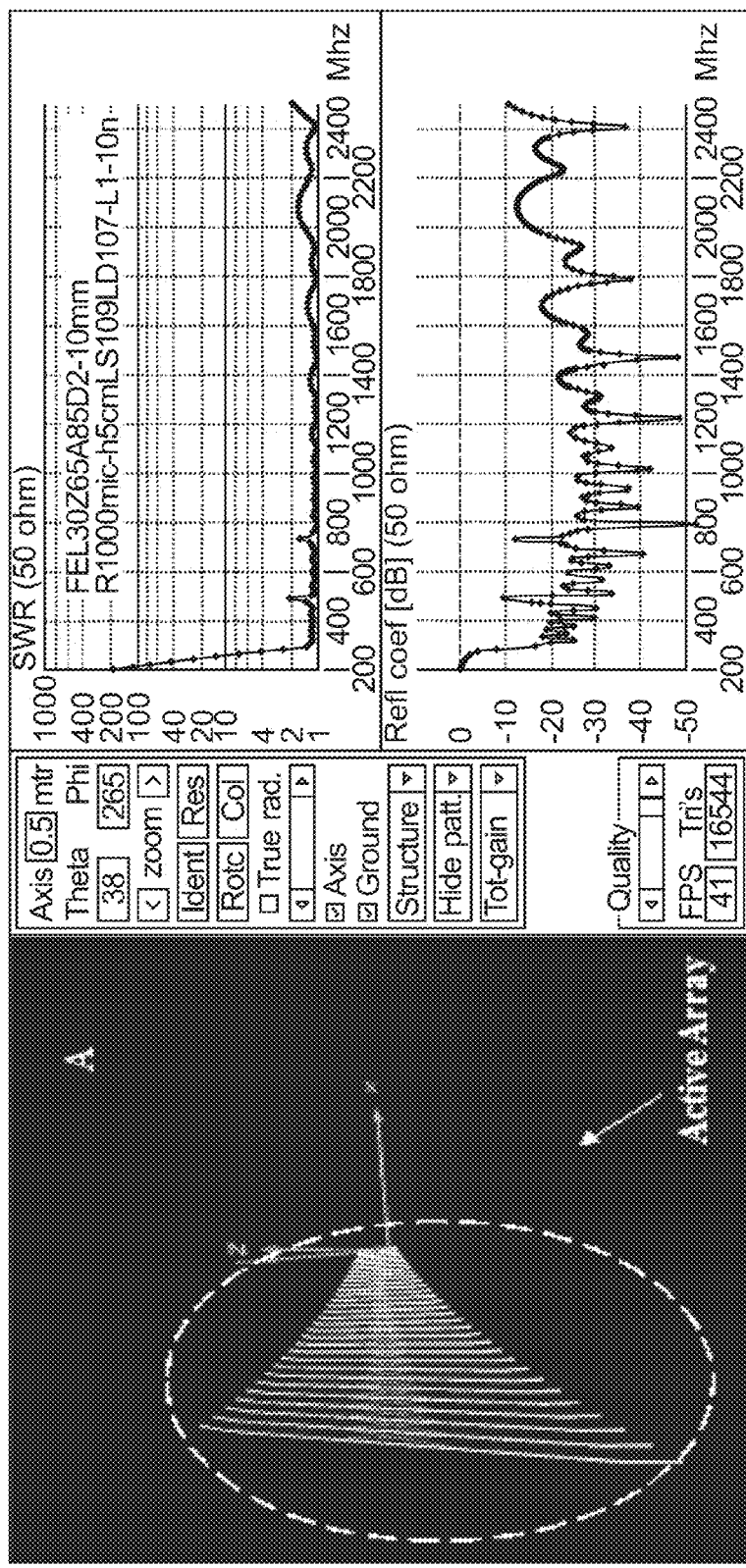
FIG. 3 is a schematic diagram illustrating physical layout of a log periodic dipole antenna array for the detector of FIG. 1, according to one embodiment, accompanied by graphs of the standing wave ratio and reflection coefficient vs. frequency for the embodiment shown in the figure.

FIG. 3 is a schematic diagram illustrating physical layout of a log periodic dipole antenna array for the detector of FIG. 1, according to one embodiment, accompanied by graphs of the standing wave ratio and reflection coefficient vs. frequency for the embodiment shown in the figure. FIG. 3 shows an embodiment with a planar LPDA 120 with a design constant (e.g., ratio of L(n−1)/Ln) of 1.09 and dl2 of 1.0 centimeters (cm), wire diameter of 0.5 millimeters (mm), 5 degree element tilt θ to the symmetrical axis 126 of the array 120, and relative spacing constant of 5% (e.g., increase in spacing from Ln to L(n−1)). The LPDA 120 shown in FIG. 3 has 30 elements and the matched impedance was selected to be about 50 Ohms. A reflection coefficient (Γ or S11) of better than −25 dB may be achieved for the LPDA 120 shown in FIG. 3.

Figure 4:
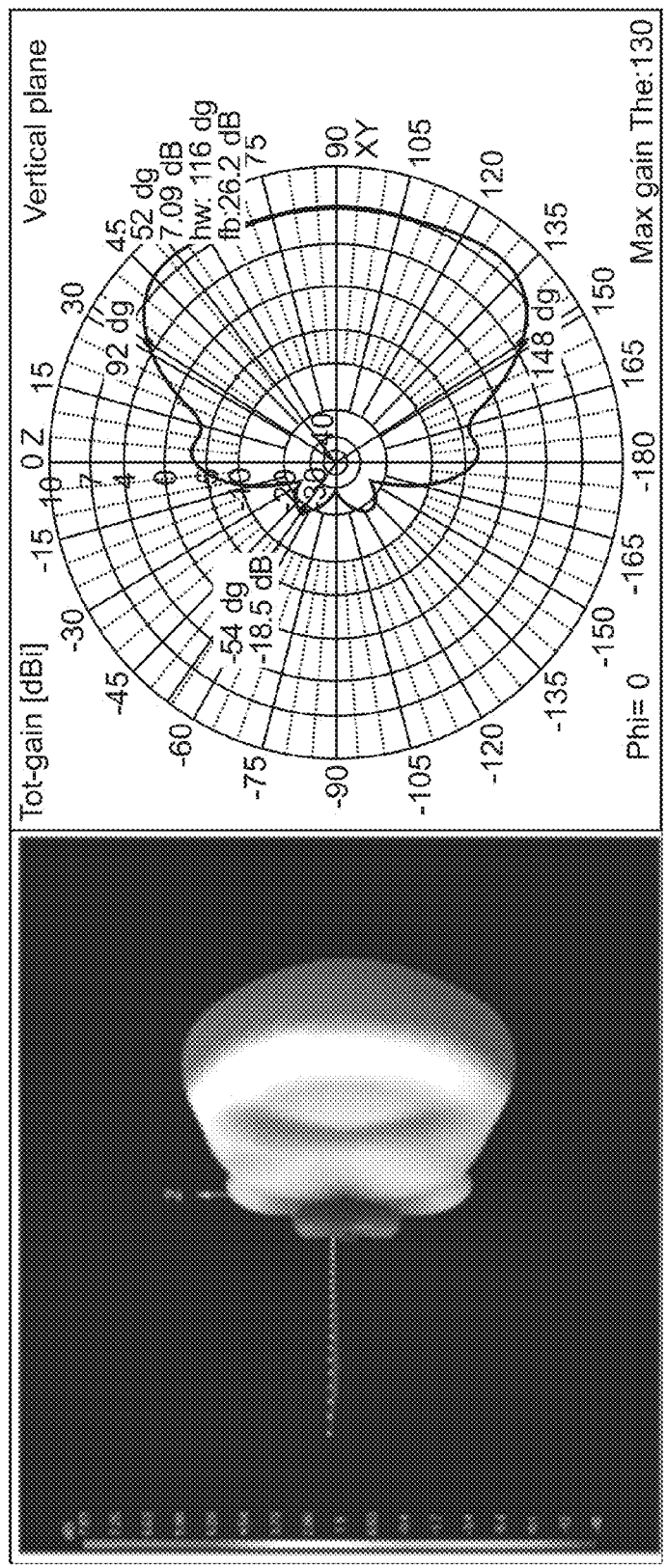
FIG. 4 is a pair of graphs showing the vertical plane far field for a detector such as the one shown in FIG. 3, in accordance with an embodiment.

FIG. 4 is a pair of graphs showing the vertical plane far field for a detector such as the one shown in FIG. 3, in accordance with an embodiment. FIG. 4 shows the vertical plane far-field of the total LPDA gain. The left portion of FIG. 4 shows bands for each dBi range level of gain, and the right portion of FIG. 4 shows the contour of maximum gain. As simulated, the LPDA shown in FIG. 3 exhibited a 9.5 dBi gain and a beam width of 116 degrees (at 3 dB below the peak). The back signal was attenuated to −18.5 dB that brings the F/B ratio to 26 dB.

Figure 5:
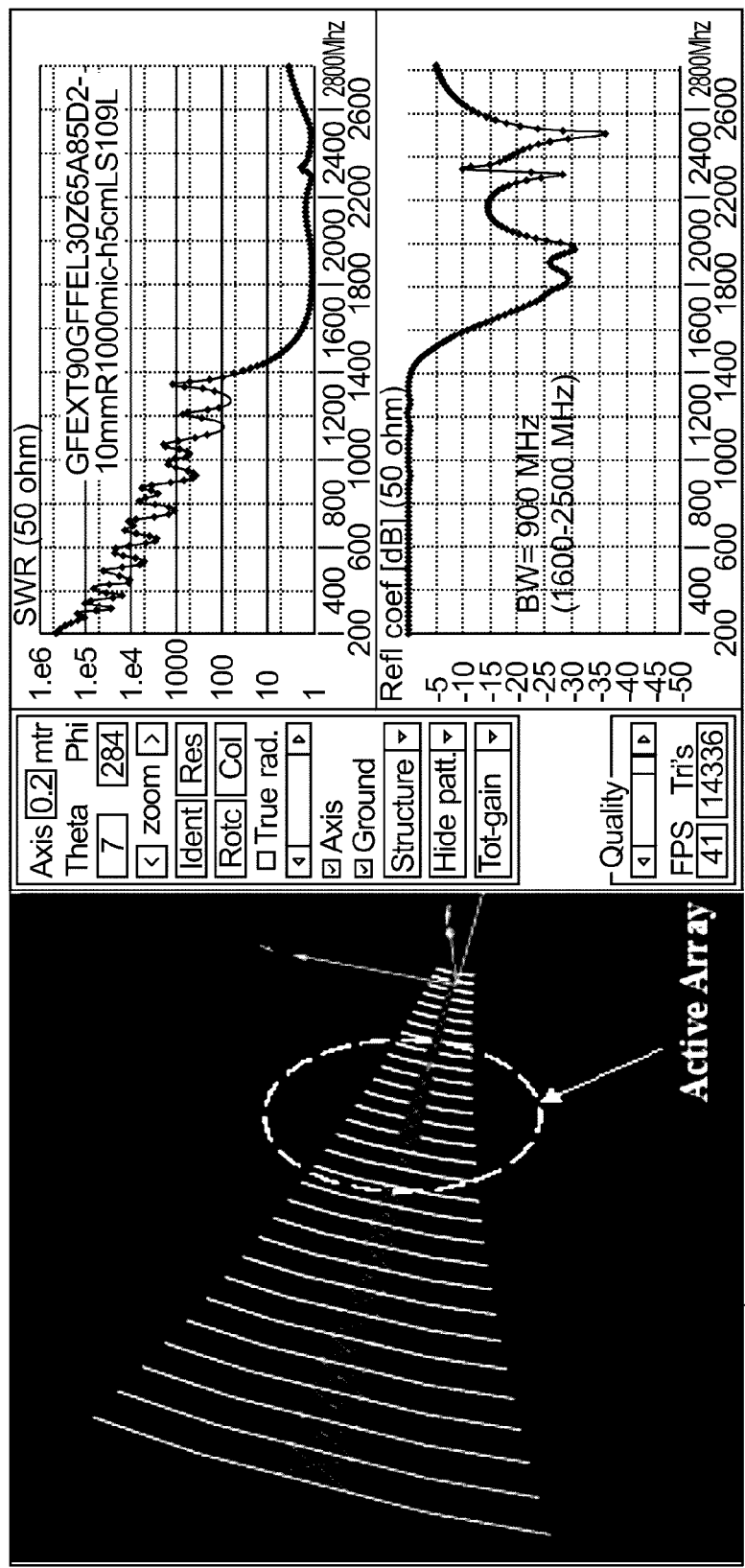
FIG. 5 is a schematic diagram illustrating physical layout of a log periodic dipole antenna array showing an example of antenna element selection corresponding to a higher frequency range, according to one embodiment, accompanied by graphs of the standing wave ratio and reflection coefficient vs. frequency for the embodiment for the embodiment shown in the figure.
Figure 6:
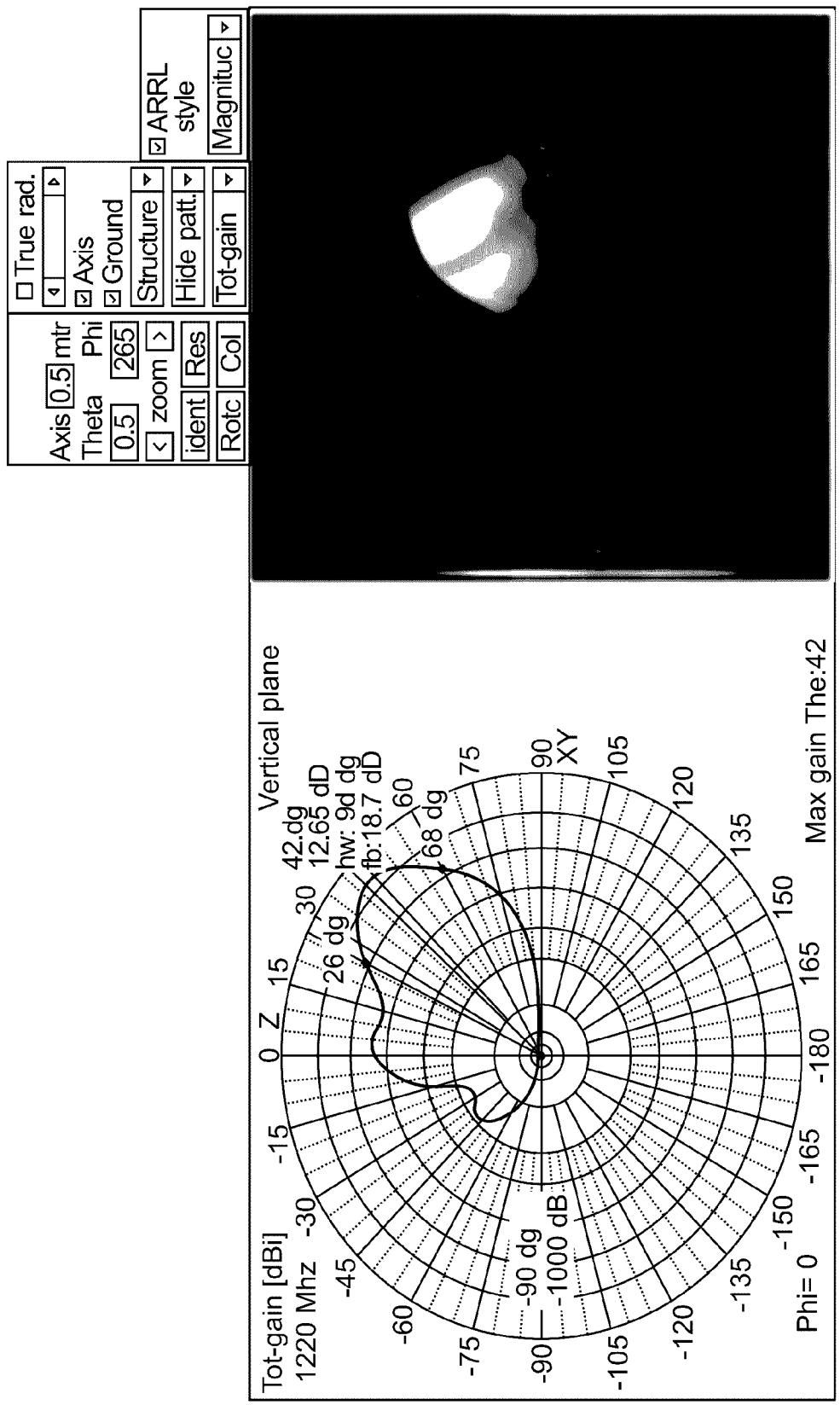
FIG. 6 is a pair of graphs showing the vertical plane far field for a detector such as the one shown in FIG. 5, in accordance with an embodiment.
Figure 7:
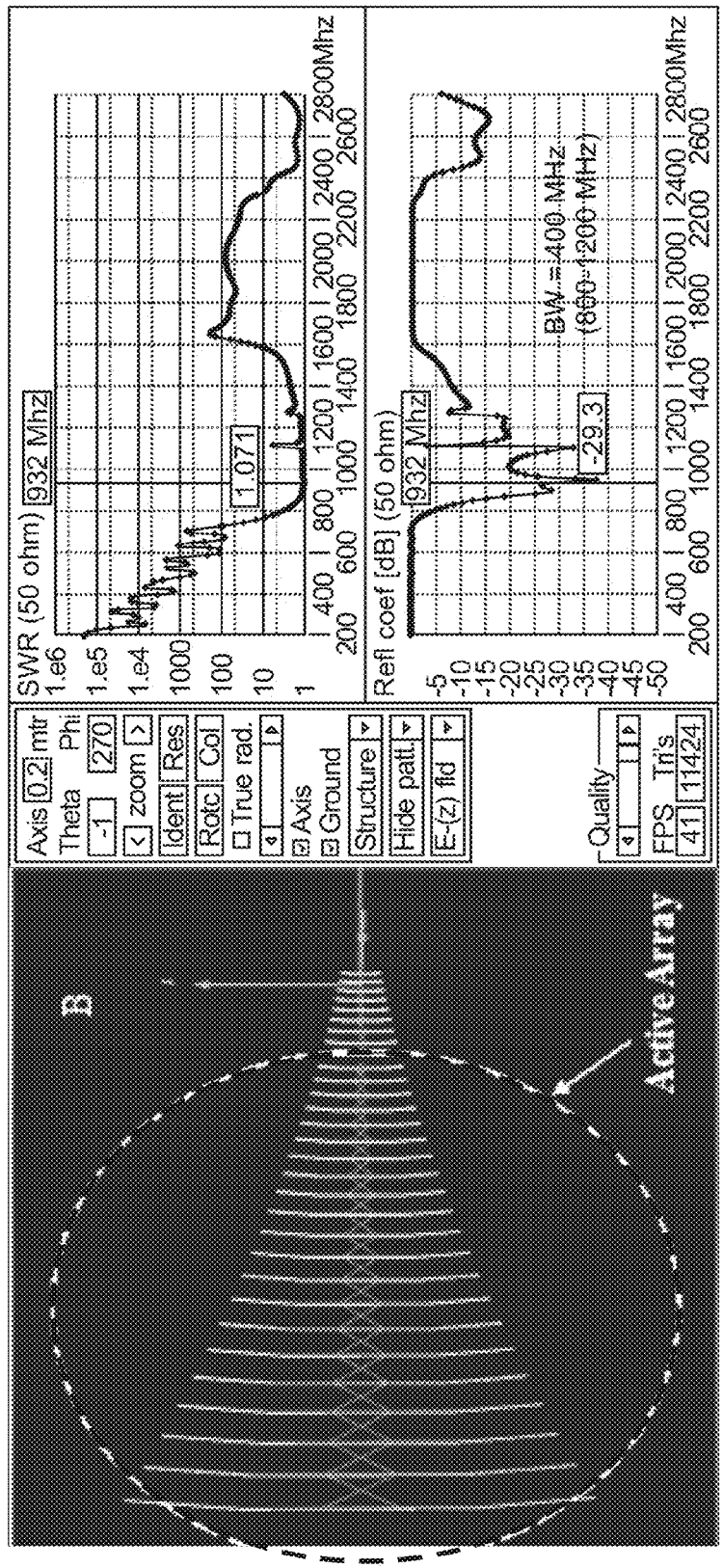
FIG. 7 is a schematic diagram illustrating physical layout of a log periodic dipole antenna array showing an example of antenna element selection corresponding to a lower frequency range, according to one embodiment, accompanied by graphs of the standing wave ratio and reflection coefficient vs. frequency for the embodiment for the embodiment shown in the figure.

FIG. 5 is a schematic diagram illustrating physical layout of a log periodic dipole antenna array showing an example of antenna element selection corresponding to a higher frequency range, according to one embodiment, accompanied by graphs of the standing wave ratio and reflection coefficient vs. frequency for the embodiment for the embodiment shown in the figure. The left portion of FIG. 5 depicts a selection of a higher-frequency section of the LPDA 120 such that GSM-1800 and GSM 1900 and 802.11 signals (see FIG. 9) can be received at different radios. The LPDA 120 simulation was performed with the antenna array above the perfect ground plane. The S11 (reflection coefficient) for the selected elements ("active array" indicated in FIG. 5) can be better (lower) than −25 dB and the total gain has increased to 7.8 dBi with 94 degrees azimuth (horizontal beam width) and 42 degrees latitude (vertical beam width). The back signal is practically depressed to nearly zero as shown in FIG. 6. In this example, a total of 8 middle frequency range elements were selected. The simulation was repeated for selecting the lower frequency bands as shown in FIG. 7. By selecting the lower-frequency section of the LPDA 120 such bands as GSM-900 and SIGINT signals (see FIG. 9) can be detected.

FIG. 6 is a pair of graphs showing the vertical plane far field for the LPDA 120 shown in FIG. 5, in accordance with an embodiment. The left portion of FIG. 4 shows the contour of maximum gain, and the right portion of FIG. 4 shows bands for each dBi range level of gain.

FIG. 7 is a schematic diagram illustrating physical layout of a log periodic dipole antenna array showing an example of antenna element selection corresponding to a lower frequency range, according to one embodiment, accompanied by graphs of the standing wave ratio and reflection coefficient vs. frequency for the embodiment for the embodiment shown in the figure. The left portion of FIG. 7 depicts a selection of a lower frequency section of the LPDA 120 such that GSM-900 and SIGINT signals (see FIG. 9) can be detected. The LPDA simulation was performed with the antenna array above the perfect ground plane. The S11 for the selected elements ("active array" indicated in FIG. 7) can be better (lower) than −25 dB and the total gain has increased to 8.45 dBi with 116 degrees azimuth and 34 degrees latitude. In this example, a total of 21 lower frequency range elements were selected.

The table shown in FIG. 8 summarizes results of the previous simulations for comparison. Column A corresponds to FIG. 3, column B corresponds to FIG. 5, and column C corresponds to FIG. 7.

FIG. 9 is a table showing examples of frequency bands of interest and some of their attributes of interest for applications of an electronic device detector system 100 in accordance with one or more embodiments. System 100 may, for example, detect an electronic device emitting radiation at a frequency band of interest and may then classify the source of RF radiation, e.g., an electronics device such as a cellular phone, camera, GPS unit, recording device, or other category of electronic device. Various categories of cellular phone, classified by RF frequency band and other attributes are shown as an example in FIG. 9.

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A system comprising:
a chain of electronic device detector units installed in a building premises, each detector unit including:
 a receiver array including a receiver unit and a plurality of antenna elements connected to the receiver unit, wherein the plurality of antenna elements includes a feed network having switches arranged so that a subset of the plurality of antenna elements is selected to communicate a radio frequency (RF) signal to the receiver unit, wherein the subset is selected according to a range of frequencies to be detected;
 a signal processing unit in communication with the receiver unit configured to identify the RF signal; and
 a classification unit configured to categorize the identified RF signal and report a result according to a set of pre-determined categories.

2. The system of claim 1, wherein:
a portion of the plurality of antenna elements comprises a log periodic dipole antenna (LPDA) array, wherein each antenna element of the LPDA array has a tilt to the symmetrical axis of the LPDA array.

3. The system of claim 1, further comprising:
a monitoring station in communication via a network with the chain of electronic device detector units, the monitoring station configured to track a detected electronic device using a known location for each of the electronic device detector units of the chain.

4. A method for detecting radio frequency (RF) radiation, comprising:
selecting a range of frequencies of RF radiation to be detected;
selecting a plurality of antenna elements of a receiver array, wherein the plurality of antenna elements includes a feed network having switches arranged so that a subset of the plurality of antenna elements is selected to communicate the RF signal to the receiver unit, wherein the subset is selected according to the selected range of frequencies;
detecting RF radiation at the selected range of frequencies using a log periodic antenna array connected to a receiver unit;
identifying a frequency of the RF signal;
classifying the RF signal according to the identified frequency and a set of pre-determined categories; and
reporting the signal and its classification to a monitoring unit.

5. The method of claim 4, further comprising:
monitoring a chain of electronic device detector unit using the monitoring unit; and
tracking a detected electronic device using a known location for each electronic device detector units of the chain.

6. The method of claim 4, further comprising:
selecting the elements of the selected subset of the plurality of antenna elements by switching them into a signal feed of a log periodic dipole antenna (LPDA), wherein elements not selected are switched out of the signal feed of the LPDA.

7. The method of claim 6, wherein:
the elements of the LPDA have a tilt to a symmetrical axis of the LPDA.

* * * * *

UNITED STATES PATENT AND TRADEMARK OFFICE
CERTIFICATE OF CORRECTION

PATENT NO. : 9,459,345 B2  
APPLICATION NO. : 14/276987  
DATED : October 4, 2016  
INVENTOR(S) : Farrokh Mohamadi Page 1 of 1

It is certified that error appears in the above-identified patent and that said Letters Patent is hereby corrected as shown below:

IN THE SPECIFICATION:

In Column 4, Line 8, change "RE" to --RF--.

IN THE CLAIMS:

Claim 5, Column 8, Line 28, change "unit" to --units--.

Claim 5, Column 8, Line 31, change "each electronic device" to --each of the electronic device--.

Signed and Sealed this  
Sixth Day of December, 2016

Michelle K. Lee  
*Director of the United States Patent and Trademark Office*